US010801983B2

(12) United States Patent
Mamigonians

(10) Patent No.: US 10,801,983 B2
(45) Date of Patent: Oct. 13, 2020

(54) EXAMINING OBJECTS WITH ELECTRIC FIELDS

(71) Applicant: Zedsen Limited, London (GB)

(72) Inventor: Hrand Mami Mamigonians, London (GB)

(73) Assignee: Zedsen Limited, London (GB)

(*) Notice: Subject to any disclaimer, the term of this patent is extended or adjusted under 35 U.S.C. 154(b) by 36 days.

(21) Appl. No.: 16/217,412

(22) Filed: Dec. 12, 2018

(65) Prior Publication Data
US 2019/0204254 A1 Jul. 4, 2019

(30) Foreign Application Priority Data

Dec. 28, 2017 (GB) .................................... 1722248

(51) Int. Cl.
G01N 27/22 (2006.01)

(52) U.S. Cl.
CPC ........... *G01N 27/22* (2013.01); *G01N 27/228* (2013.01)

(58) Field of Classification Search
CPC .... G01N 27/22; G01N 27/221; G01N 27/222; G01N 27/223; G01N 27/225; G01N 27/226; G01N 27/24; G01N 27/228; G01N 27/028; G01R 27/26; G01R 27/2605; G01R 27/2617; G01R 27/2623; G01R 29/08; G01R 29/0807
See application file for complete search history.

(56) References Cited

U.S. PATENT DOCUMENTS

| 5,551,288 | A | * | 9/1996 | Geraldi | B64D 15/20 324/671 |
|---|---|---|---|---|---|
| 6,369,588 | B1 | | 4/2002 | Sleefe et al. | |
| 8,866,490 | B1 | | 10/2014 | Mandziy et al. | |
| 8,994,383 | B2 | | 3/2015 | Mamigonians | |
| 10,585,529 | B2 | * | 3/2020 | Qiao | G06F 3/04164 |
| 2008/0024455 | A1 | | 1/2008 | Lee et al. | |

(Continued)

FOREIGN PATENT DOCUMENTS

| GB | 2279756 A | * | 1/1995 | ............. G01B 7/287 |
|---|---|---|---|---|
| GB | 2488600 A | | 9/2012 | |
| WO | 2013055708 A1 | | 4/2013 | |

OTHER PUBLICATIONS

Corresponding International Patent Application No. PCT/GB2018/000156, International Search Report, dated Nov. 3, 2019.

(Continued)

*Primary Examiner* — Lee E Rodak
(74) *Attorney, Agent, or Firm* — Cooper Legal Group, LLC

(57) ABSTRACT

The examination of objects using electric fields is disclosed. A selected electrode (202) is energized as a transmitter and a different selected electrode (203) is monitored as a receiver to establish a capacitively coupled pair of electrodes defining a coupling operation. A plurality of transmitter electrodes are sequentially energized to establish a plurality of coupling operations during a scanning cycle. An analog output signal (205) from the monitored receiver electrode is sampled to produce first sample data (211) during each coupling operation. Further sampling of the analog output signal is then performed to produce additional sample data (213) during each coupling operation.

20 Claims, 16 Drawing Sheets

(56) References Cited

U.S. PATENT DOCUMENTS

| | | | |
|---|---|---|---|
| 2012/0176179 A1* | 7/2012 | Harders | H03K 17/962 327/517 |
| 2012/0223723 A1* | 9/2012 | Mamigonians | G01L 1/142 324/649 |
| 2014/0267155 A1* | 9/2014 | Aubauer | G01R 27/2605 345/174 |
| 2017/0090609 A1* | 3/2017 | Petrovic | G06F 3/044 |
| 2017/0299416 A1* | 10/2017 | Rondano | G01F 23/263 |
| 2018/0164914 A1* | 6/2018 | Maharyta | G06F 3/0416 |

OTHER PUBLICATIONS

Corresponding Great Britain Search Report, Application No. 1722248.0 dated Jun. 28, 2018, 1 page.

* cited by examiner

EXAMINING OBJECTS WITH ELECTRIC FIELDS

CROSS REFERENCE TO RELATED APPLICATIONS

This application claims priority from United Kingdom patent application No. 1722248.0 filed on Dec. 28, 2017, the whole contents of which are incorporated herein by reference.

BACKGROUND OF THE INVENTION

The present invention relates to an apparatus for examining objects with electric fields. The present invention also relates to a method of examining objects using electric fields created by a set of electrodes.

It is known to examine objects with electric fields, as disclosed in U.S. Pat. No. 8,994,383, assigned to the present applicant. During a coupling operation, a first active electrode is energized and a second active electrode is monitored by sampling a peak value. However, problems exist in that different object types may produce similar peak values.

BRIEF SUMMARY OF THE INVENTION

According to a first aspect of the present invention, there is provided an apparatus for examining objects with electric fields. The apparatus comprises a set of active electrodes, an energizing circuit for energizing a selected one of said electrodes as a transmitter and a monitoring circuit for monitoring a selected one of said electrode as a receiver, such that an energized transmitter electrode and a monitored receiver electrode establish a coupled pair of capacitively coupled electrodes during a coupling operation. Furthermore, there is provided a processor that is configured to sequentially energize a plurality of transmitter electrodes to establish a plurality of coupling operations during a scanning cycle and sample an analog output signal from the monitoring circuit during each of the coupling operations. Furthermore, in order to improve the quality of the data received from the procedure, the processor will, for one or more of the coupling operations, not only sample the analog output signal once, but then, within the same coupling operation, further sample the analog output signal to produce one or more additional output samples derived from the same input energization of a selected transmitter electrode.

In an embodiment, the processor includes an analog to digital convertor configured to produce digital output values each time a specific output signal is sampled and then further sampled. In an embodiment, the analog to digital convertor produces a first digital sample substantially at a peak of the analog output signal. Thereafter, the analog to digital convertor may produce further digital samples at predetermined intervals after the peak.

According to a second aspect of the present invention, there is provided a method of examining objects using electric fields created by a set of electrodes. A selected electrode from the set is energized as a transmitter and a different selected electrode is monitored as a receiver, to establish a capacitively coupled pair of electrodes defining a coupling operation. The method sequentially energizes a plurality of transmitter electrodes to establish a plurality of coupling operations during a scanning cycle. An analog output signal is sampled from a monitored receiver electrode to produce first sampled data during each coupling operation. Furthermore, for each coupling operation, during which a single energization of a transmitter electrode has been performed, further sampling of the analog output signal occurs to produce additional sampled data.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processors distinguish by ordinal phrases such as "first" and "second" do not necessarily define an order of ranking or any sort.

DETAILED DESCRIPTION OF THE INVENTION

FIG. 1

Figure 1:
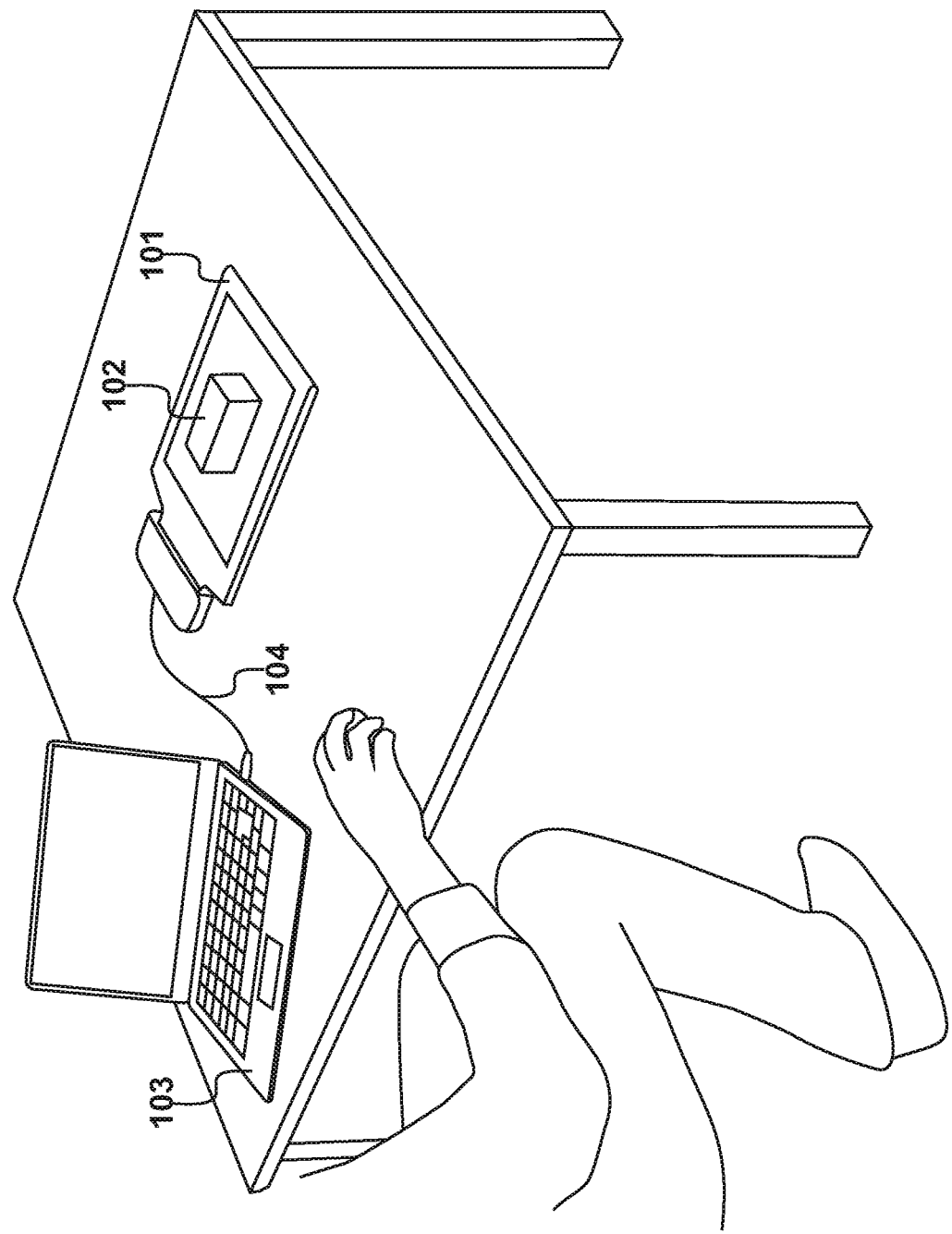
FIG. 1 shows an examination apparatus.

An examination apparatus 101 is shown in FIG. 1, for examining electrical properties of objects such as an object 102, using electric fields. The examination apparatus 101 communicates with a data-processing system 103 via a data-communication cable 104, possibly designed in accordance with established USB protocols.

In an alternative embodiment, wireless communication is provided between the examination apparatus 101 and the data-processing system 103.

FIG. 2

Figure 2:
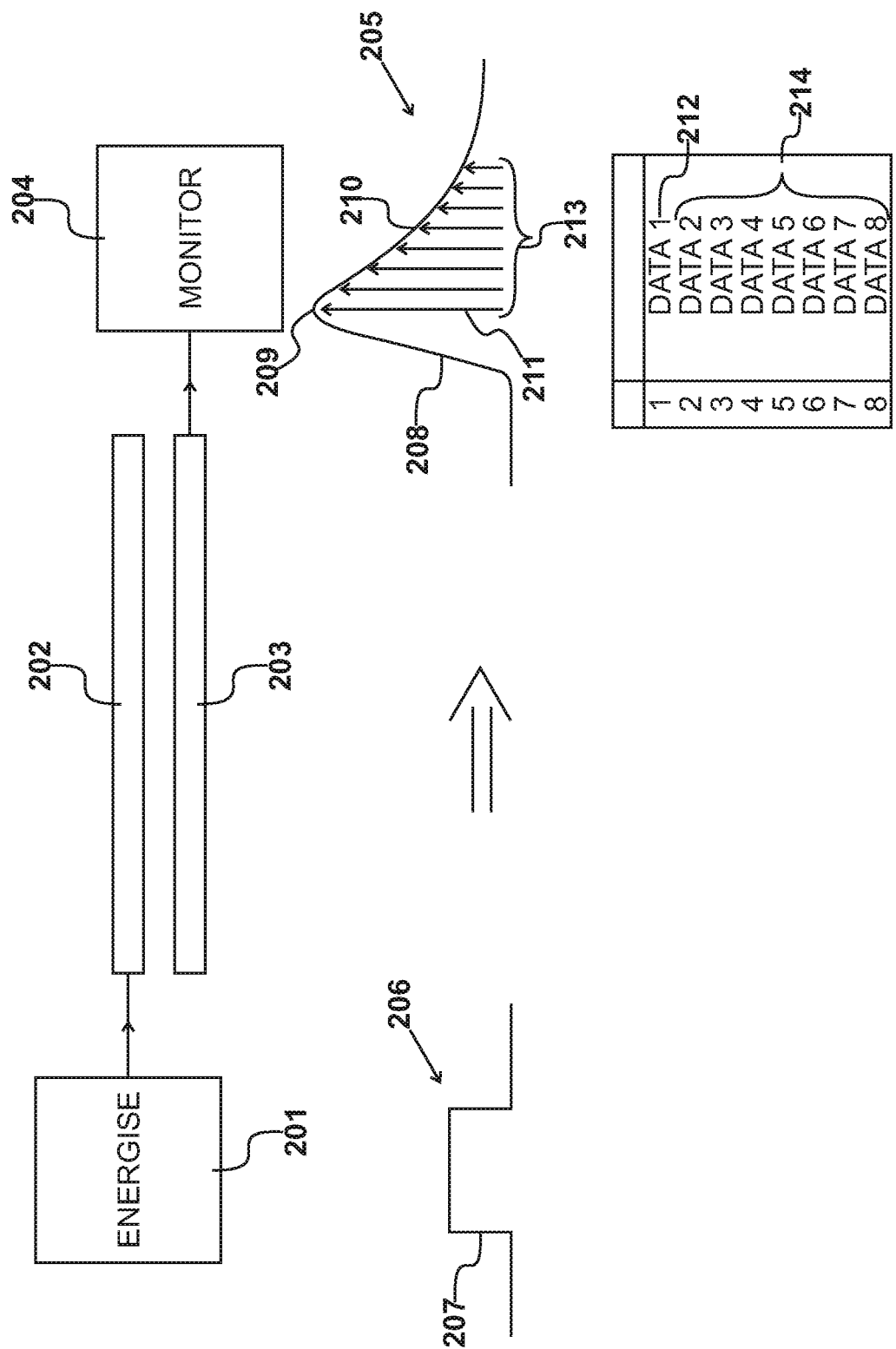
FIG. 2 illustrates an overview of aspects of the present invention.

As illustrated in FIG. 2, an aspect of the present invention generates an energizing signal, as illustrated at 201. This is used to energize a transmitter electrode 202 during a coupling operation. During this coupling operation, a receiver electrode 203 is monitored, as illustrated at 204, to produce an analog output signal 205. During the coupling operation, an energizing pulse 206 includes a sharp rising edge 207. The receiver electrode 203 is capacitively coupled to the transmitter electrode 202 and, as such, the resulting analog output signal has characteristics determined by the impedance of the transmission environment. This results in the presentation of a rising slope 208, a peak value 209 and a falling slope 210.

The analog output signal is sampled, as illustrated by a first arrow 211, to produce first sample data 212. In addition, further sampling 213 is performed to produce additional sample data 214 during the same coupling operation.

As illustrated in FIG. 2, the first sampling step may be performed substantially at a peak value 209 of the analog output signal. Furthermore, the further sampling step may produce additional sample data after the peak value. In the embodiment illustrated in FIG. 2, the further sampling step produces seven instances (DATA 2-DATA 8) of additional sample data 214. Typically, in an embodiment, more than two instances of additional sample data are produced but less than twenty instances of additional sample data are produced, after the peak value 209.

FIG. 3

Figure 3:
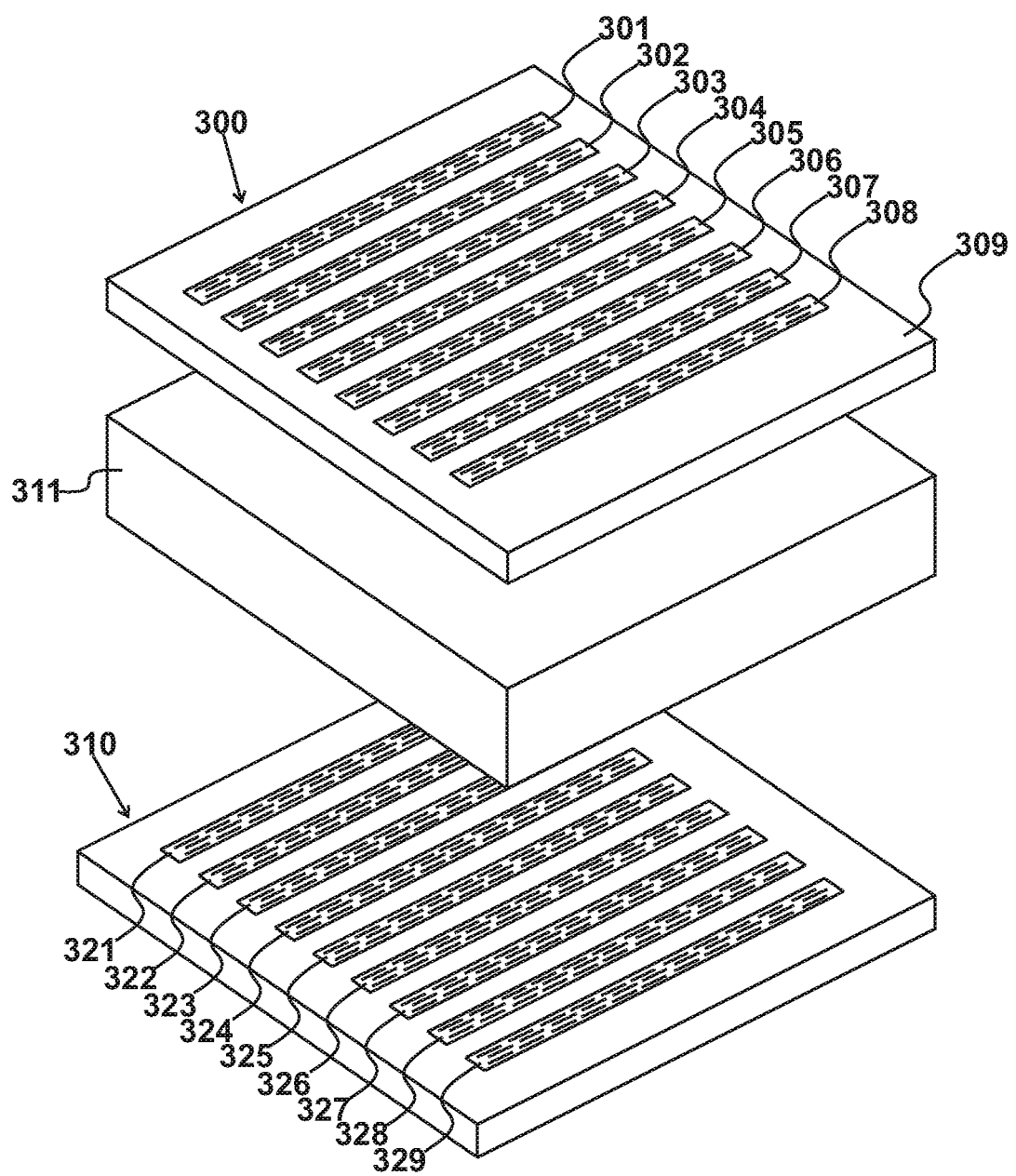
FIG. 3 shows an exploded view of the examination apparatus embodying an aspect of the present invention, as identified in FIG. 1.
Figure 4:
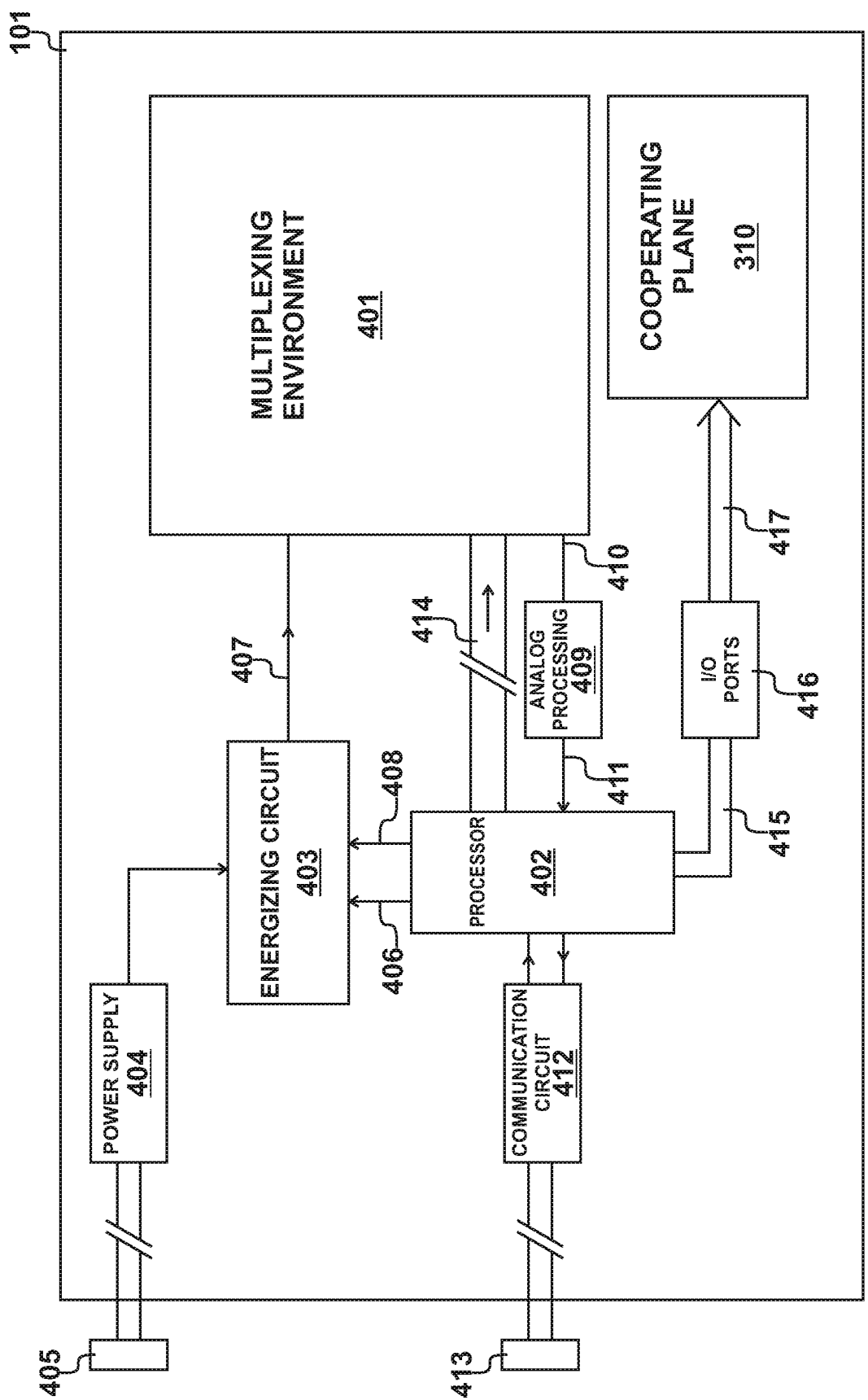
FIG. 4 shows a block diagram of the workings of the examination apparatus identified in FIG. 1.

An exploded view of the examination apparatus 101 embodying the present invention is illustrated in FIG. 3. The apparatus includes an active plane 300 of active electrodes, including a first active electrode 301, a second active electrode 302, a third active electrode 303, a fourth active electrode 304, a fifth active electrode 305, a sixth active electrode 306, a seventh active electrode 307 and an eighth active electrode 308. A processor, described with reference to FIG. 4, is configured to energize a first of the active electrodes during a coupling operation and monitor a second of the active electrodes during this coupling operation. The electrodes are mounted on a dielectric membrane 309 that also includes an insulating material. However, instead of being provided with a ground plane, the examination apparatus 101 has a cooperating plane 310 that is displaced from the active plane 300 by a spacer material 311.

The cooperating plane 310 has cooperating electrodes including a first cooperating electrode 321, a second cooperating electrode 322, a third cooperating electrode 323, a fourth cooperating electrode 324, a fifth cooperating electrode 325, a sixth cooperating electrode 326, a seventh cooperating electrode 327, an eighth cooperating electrode 328 and a ninth cooperating electrode 329. In operation, a processor selects an electrical attribute for a cooperating-electrode in the cooperating plane 310 during each coupling operation, in which a first active electrode is energized and a second active electrode is monitored. In an embodiment a cooperating electrode may be grounded, left floating or energized.

FIG. 4

A block diagram of the workings of the examination apparatus 101 is illustrated in FIG. 4. In FIG. 4, the dielectric membrane 202, with the group 201 of parallel electrodes, is included within a multiplexing environment 401. In addition to the dielectric membrane 202, the multiplexing environment 401 also includes a de-multiplexer for selectively de-multiplexing energizing input pulses, along with a multiplexer for monitoring selected output signals.

A processor 402, implemented as a microcontroller in an embodiment, controls the de-multiplexer and the multiplexer to ensure that the same electrode cannot both be energized and monitored during the same coupling operation. An energizing circuit 403 is energized by a power supply 404 that in turn may receive power from an external source via a power input connector 405. A voltage-control line 406, from the processor 402 to the energizing circuit 403, allows the processor 402 to control the voltage (and hence the energy) of energizing signals supplied to the multiplexing environment 401 via a strobing line 407. The timing of each strobing signal is controlled by the processor 402 via a trigger-signal line 408.

An output from the multiplexing environment 401 is supplied to an analog processing circuit 409 over a first analog line 410. A conditioning operation is performed, by the analog processing circuit 409, allowing analog output signals to be supplied to the microcontroller via a second analog line 411. The processor 402 also communicates with a two-way-data-communication circuit 412, thereby allowing a data interface 413 to connect with the data-communication cable 104.

In operation, the processor 402 supplies addresses over address busses 414 to the multiplexing environment 401, to achieve the required functionality. Thus, having supplied addresses to the multiplexing environment 401, an energizing voltage is supplied via strobing line 407, resulting in an output signal being supplied to the processor 402, as part of a complete coupling operation. At the processor 402, a monitored analog signal is sampled to produce a digital representation that may be stored locally or uploaded to the data-processing system 103 via the data interface 414.

In an embodiment, the processor 402 also includes input/output ports that supply control data on control lines 415 to respective cooperating electrodes within the cooperating plane 310. Thus, under program control, any of these control lines can be grounded, left floating or energized.

FIG. 5

Figure 5:
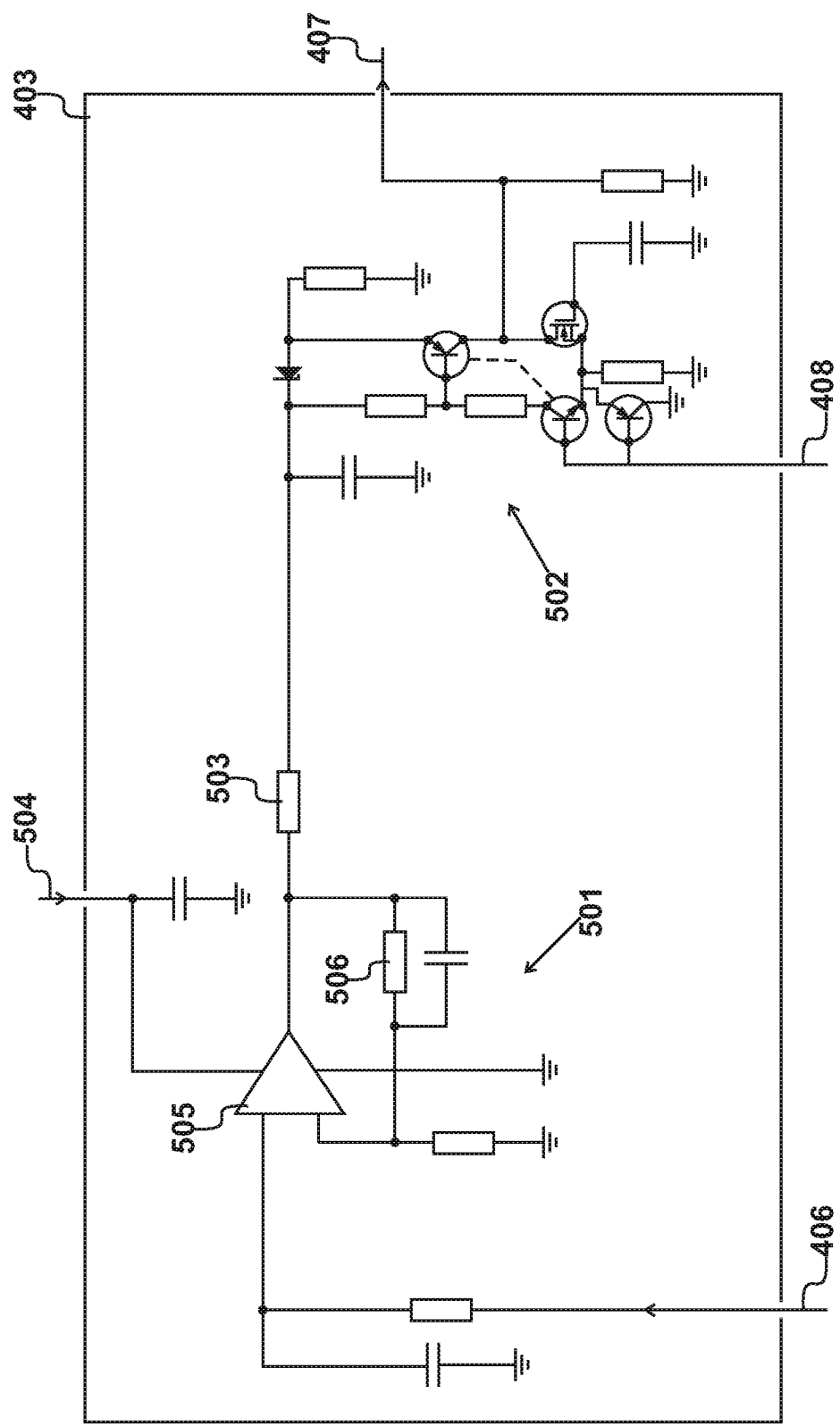
FIG. 5 shows a schematic representation of the energising circuit identified in FIG. 4.

A schematic representation of the energizing circuit 403 is shown in FIG. 5. The energizing circuit 403 includes a voltage control circuit 501 connected to a strobing circuit 502 via a current limiting resistor 503.

A voltage-input line 504 receives energizing power from the power supply 404 to energize an operational amplifier 505. The operational amplifier 505 is configured as a comparator and receives a reference voltage via a feedback resistor 506. This is compared against a voltage-control signal received on the voltage-control line 406 to produce an input voltage for the strobing circuit 502.

In the embodiment of FIG. 5, the strobing circuit 502 includes two bipolar transistors configured as a Darlington pair, in combination with a MOSFET. This creates strobing pulses with sharp rising edges and sharp falling edges, that are conveyed to the strobing line 407, after receiving a triggering signal on the trigger-signal line 408.

FIG. 6

Figure 6:
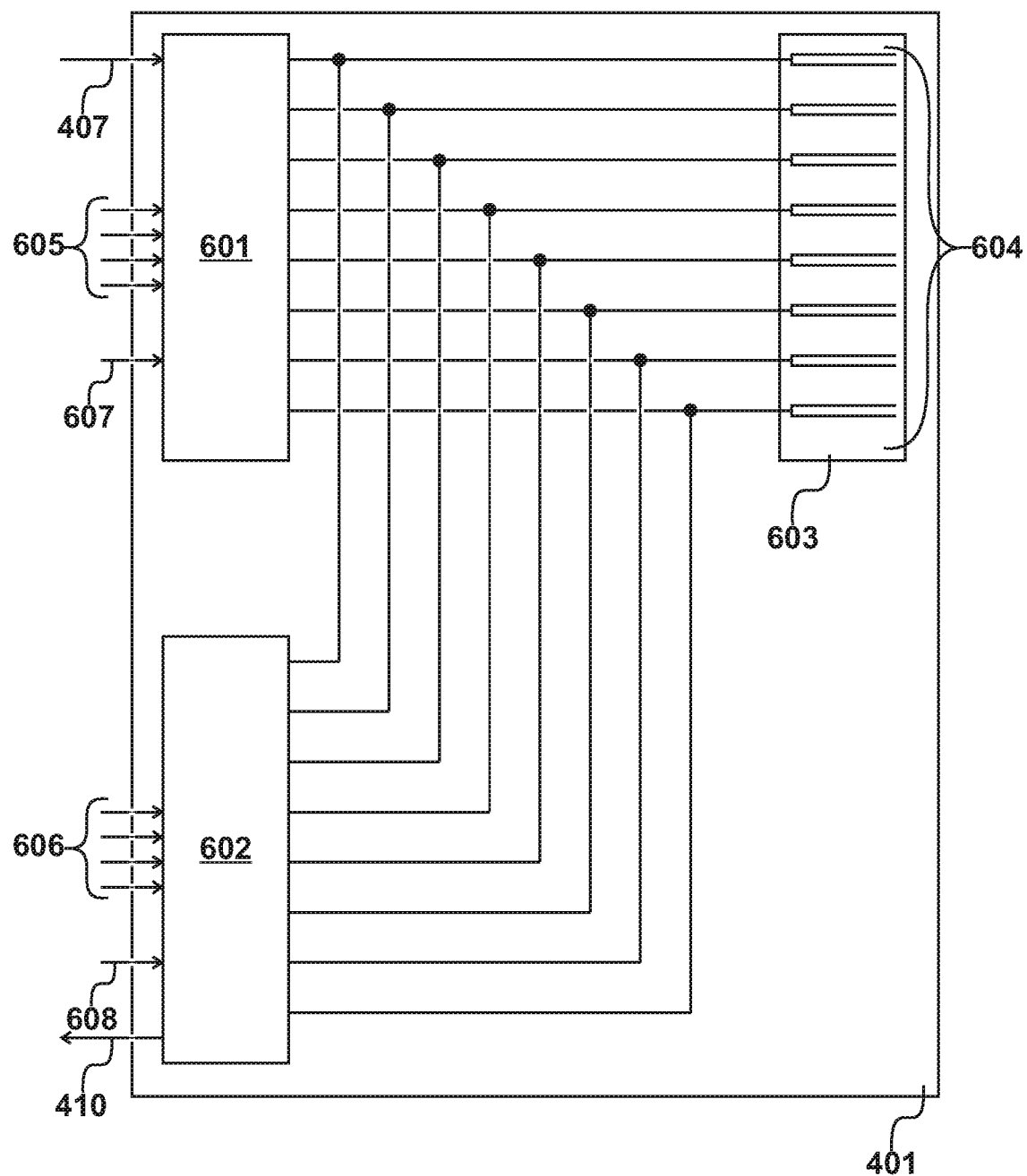
FIG. 6 shows an example of the multiplexing environment identified in FIG. 4.

An example of the multiplexing environment 401 is detailed in FIG. 6, in which a first multiplexing device 601 supplies energizing input pulses. During a scanning cycle, a second multiplexing device 602 monitors analog output signals. In this alternative embodiment, a dielectric membrane 603 supports a group of sixteen parallel electrodes 604, but a similar approach can be taken for a group of fewer electrodes, say eight, or a group of more electrodes, say thirty-two.

The address busses 414 include an input-address bus 605, and an output-address bus 606, for addressing the first multiplexing device 601 and the second multiplexing device 602 respectively. The addressing space for the input address bus 605 and the addressing space for the output address bus 606 may be similar, which may assist in terms of ensuring that the same address cannot be supplied simultaneously to both the input address bus 605 and the output address bus 606.

The first multiplexing device 601 also includes a first enabling line 607. Similarly, the second multiplexing device 407 includes a second enabling line 608. In operation, addresses are supplied to the input-address bus 605 and to the output-address bus 606; but line selection does not actually occur until the multiplexing devices receive a respective enabling signal.

The first multiplexing device 601 receives an input pulse from the energizing circuit 403 via the strobing line 407. Multiple strobing operations are performed, such that an input energizing voltage is supplied to electrodes performing a transmitter function. Strobing signals are distributed to multiple inputs; therefore the first multiplexing device 601 performs a de-multiplexing operation.

The second multiplexing device 602 performs a multiplexing operation, in that multiple output signals are selected sequentially and then combined onto the first analog line 410, for reception by the monitoring circuit 409. Thus, in this embodiment, the multiplexing environment is established by a single first multiplexing device for input signals and a single second multiplexing device for output signals, both of which are connected to all sixteen of the available electrodes. If a greater number of electrodes are present upon a dielectric membrane, it is possible for additional multiplexing devices to be provided such that, for example, a pair of multiplexing devices may provide the input de-multiplexing function and a further pair of multiplexing devices may provide the multiplexing output function.

During a coupling operation, an input address is supplied on the input-address bus 605 and an output address is supplied on the output-address bus 606. The addresses are enabled such that, at a particular point in time, the output multiplexer 602 is enabled and is therefore configured to monitor output signals on the addressed output electrodes. The selected input electrode is then energized by the application of a strobing pulse.

A predetermined delay occurs before a sample of the voltage monitored on the output electrode is taken at a sampling instant. The analog voltage is conditioned by the analog processing circuit 409, which in turn supplies a conditioned voltage to the microcontroller 402 via the second monitoring line 411. Digital-to-analog conversion then takes place within the microcontroller 402, such that the point at which the sampling instant occurs is determined by the microcontroller.

FIG. 7

Figure 7:
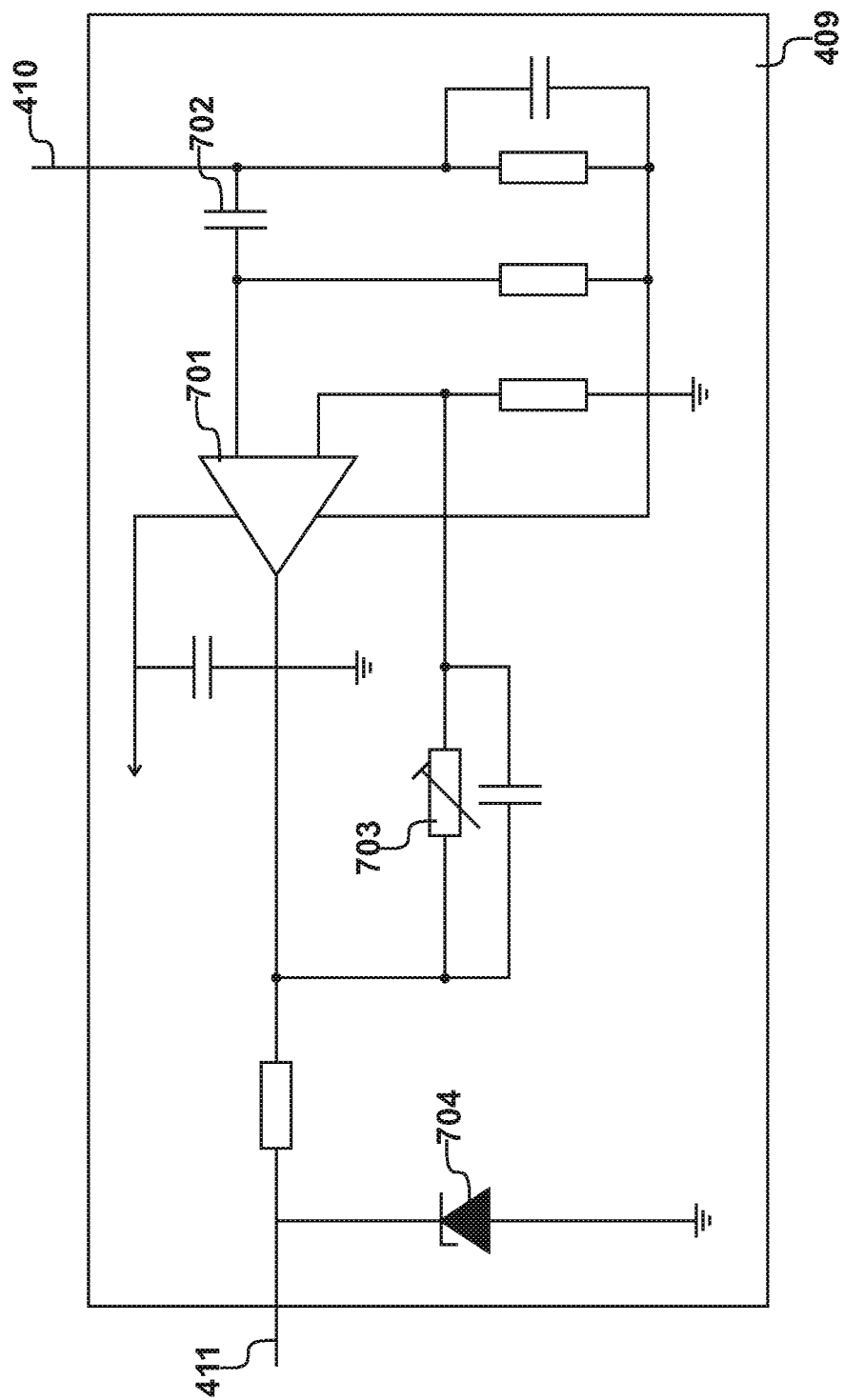
FIG. 7 shows the analog processing circuit identified in FIG. 4.

An example of an analog processing circuit 409 is illustrated in FIG. 7. Signals received on the first analog line 410 are supplied to a buffering amplifier 701 via a decoupling capacitor 702. During an initial set up procedure, a variable feedback resistor 703 is trimmed to optimize the level of monitored signals supplied to the processor 402 via the second monitoring line 411. A Zener diode 704 prevents excessive voltages being supplied to the processor 402.

FIG. 8

Figure 8:
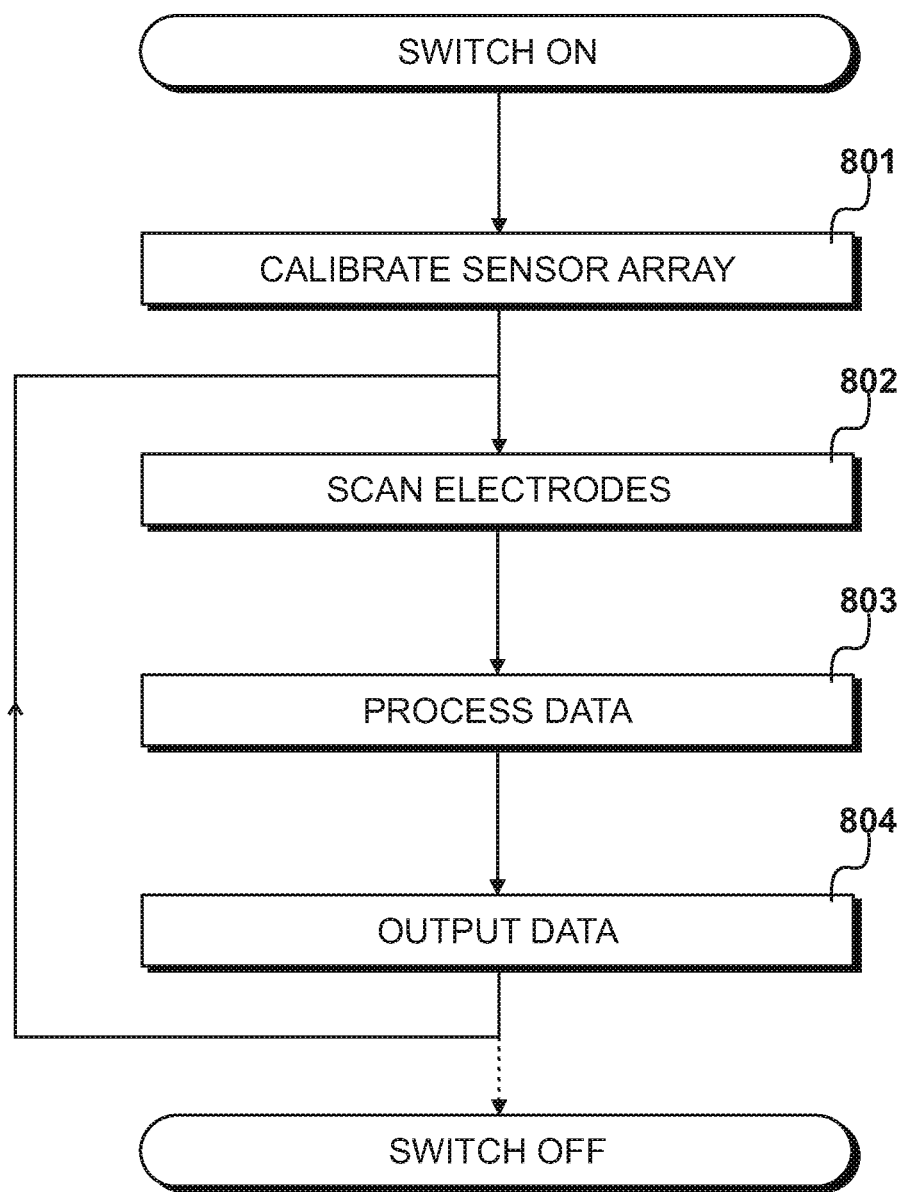
FIG. 8 illustrates procedures performed by the processor identified in FIG. 4.

Procedures performed by the processor 402 are illustrated in FIG. 8. After an initial switch on, possibly initiated by the data-processing system 103, the examination apparatus is calibrated at step 801. This enables a reference level to be established, prior to the application of an object.

After the application of an object, the electrodes are scanned at step 802. Each scanning cycle consists of a plurality of coupling operations, with each coupling operation engaging a unique combination of transmitter electrode and receiver electrode.

At step 803, data is processed and the degree of local data processing will depend upon the processing capabilities provided by the processor 402. In an embodiment, the level of received monitored signals may be compared against a reference and, where appropriate, a control voltage on the voltage-control line 406 may be adjusted. Furthermore, in an embodiment, the control voltage may be adjusted when deeper penetration is required.

More sophisticated processing may be achieved by the data-processing system 103, therefore output data is supplied to the data-processing system 103 at step 804. Thereafter, further scanning is performed at step 802 and the procedures are repeated until a de-activation command is received.

FIG. 9

Figure 9:
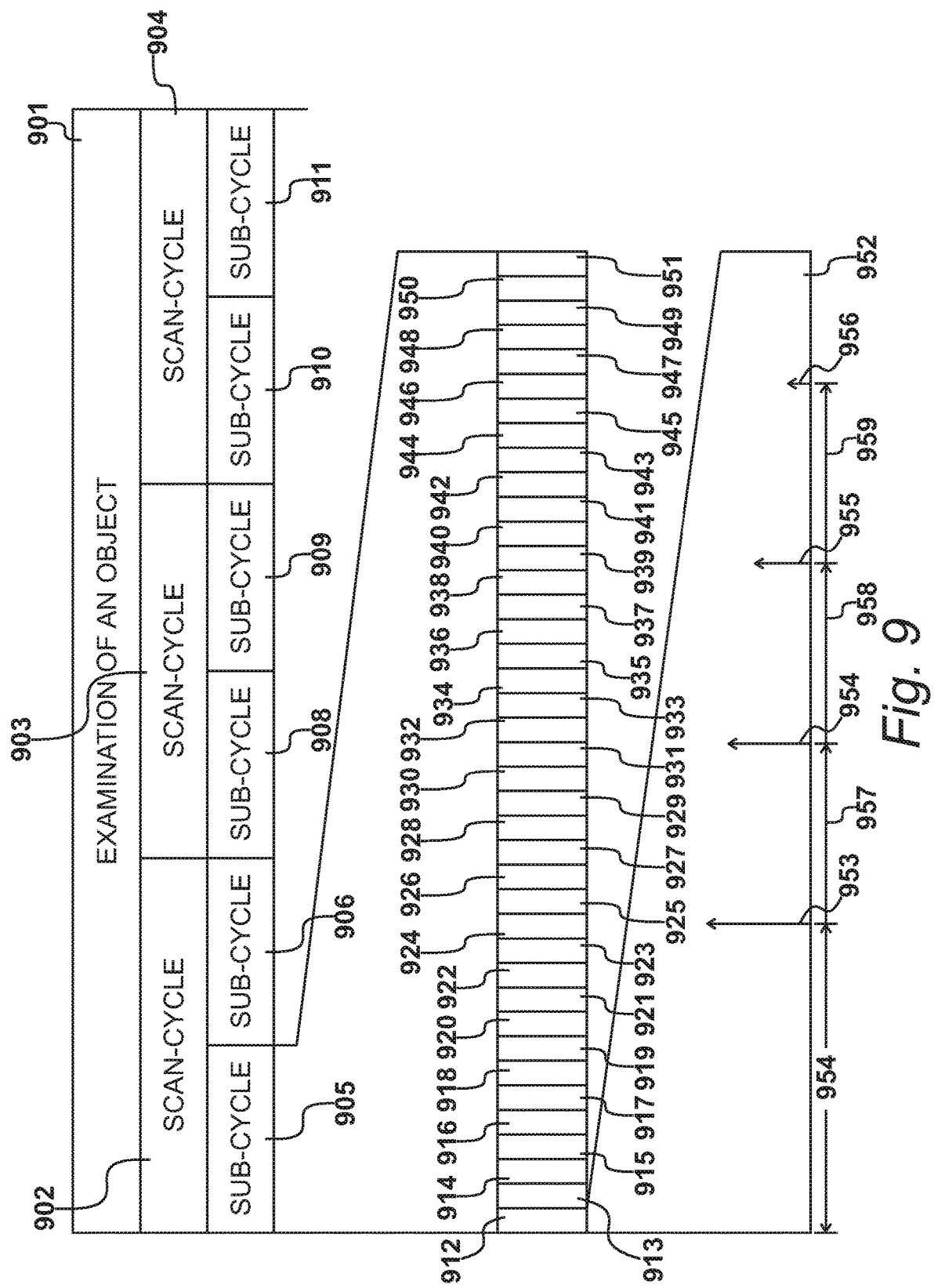
FIG. 9 shows an example of a working period.

During a working period, many objects may be examined. The duration of an individual examination is illustrated in FIG. 9 and similar procedures are performed for each object. An examination for a particular object starts by arranging the object on the apparatus, as shown in FIG. 1.

During an examination process 901, transmitter electrodes are energized and receiver electrodes are monitored. Such a procedure may be referred to informally as scanning. Thus, during examination process 901, many scanning cycles may be performed. For the purposes of this illustration, during examination process 901, a first scanning cycle 902 is performed, followed by a similar second scanning cycle 903 and a similar third scanning cycle 904.

A particular scanning cycle may be represented as a particular unique pattern of energizing and monitoring operations. In an embodiment, a scanning cycle is not completed until all of the available electrodes have been energized and all of the available electrodes have been monitored. However, such a procedure may take a significant amount of time and in alternative embodiments, selected electrodes are energized and selected electrodes are monitored, in an attempt to optimize the level of data received, while minimising the number of coupling operations required. In this way, it is possible to repeat the scanning cycle more times during the examination of an object and, in some circumstances, make changes to other operating conditions; again, with a view to optimizing the quality of the data received.

In an embodiment, it is also possible to identify a particular scanning pattern that may be repeated at different positions within the array of available electrodes. In an embodiment, the array may be divided; with a similar scanning pattern being deployed upon each divided section.

In the embodiment of FIG. 3, eight active electrodes are available and a complete scanning cycle may involve all of these electrodes, whereafter a similar pattern is repeated for the next scanning cycle. In the embodiment of FIG. 6, sixteen electrodes are available and again a similar scanning operation could be performed with reference to all sixteen electrodes, before the scanning cycle is repeated. However, as an alternative approach, it is possible to divide the sixteen-electrode array into two groups of eight electrodes. The first group undergoes a scanning cycle, whereafter the second group undergoes a similar scanning cycle. A complete cycle therefore involves performing operations with the first group followed by similar operations on the second group. Consequently, it is possible to identify the first group of scanning operations as being within a first sub-cycle 905, with the second group of operations falling within a second sub-cycle 906. Thus, scanning cycle 902 now comprises sub-cycle 905 and sub-cycle 906.

Similarly, the second scanning cycle 903 is made up of a third sub-cycle 908 followed by a fourth sub-cycle 909. Thereafter, the third scanning cycle 904 is implemented by a fifth sub-cycle 910 followed by a sixth sub-cycle 911.

Each sub-cycle 904 to 911 involves a similar set of coupling operations, representing a similar coupling pattern performed upon the selected group of electrodes. These may consist of a first coupling operation 912, followed by a second coupling operation 913, followed by a third coupling operation 914, followed by a fifth coupling operation and so on, until the fortieth coupling operation 951 in this example. Thereafter, similar coupling operations are performed for the next sub-cycle 906.

Each coupling operation within a sub-cycle is unique, in terms of the particular electrode selected as the transmitter in combination with the particular electrode selected as the receiver. Each coupling operation consists of energizing the selected transmitter electrode and monitoring the selected receiver electrode.

Due to capacitive coupling, each monitoring process monitors a voltage at the receiver electrode. To determine electrical properties of objects, a measurement is required. In an embodiment, this measurement is achieved by performing a process of analog-to-digital-conversion, thereby allowing the result of the conversion to be processed within the digital domain.

As illustrated in FIG. 9, a coupling operation, such as the first coupling operation 912, takes place within a monitored duration 952. Within the monitored duration 952, a first sampling instant 953 occurs.

To optimize results received from the examination process, the first sampling instant 953 does not occur immediately following the generation of an input strobing signal. Although, in an embodiment, a sharp, rapidly rising strobing input voltages are applied to the transmitter electrodes, the resulting output signals will not rise so steeply; as a result of the electrical properties of the device and the electrical properties of the objects being examined. Thus, to optimize the value of the information derived from the procedure, the first sampling instant 953 is delayed by a predetermined delay period 954.

In accordance with aspects of the present invention, after sampling instant 953, further samples of the analog output signal are made, to produce additional sample data during the same coupling operation. Thus, in this embodiment, the first sampling instant 953 is followed by a second sampling instant 954, a third sampling instant 955 and a fourth sampling instant 956. In this embodiment, a second sampling instant 954 is performed after a second interval 957. Similarly, the third sampling instant 955 is performed after a third interval 958, of a substantially similar duration to the second interval 957. Again, the fourth sampling instant 956 occurs after a fourth interval 959, which is again of a substantially similar duration to the third interval 958. Thus, the instances of the additional sample data are separated by similar second intervals.

In an alternative embodiment, the second, third and fourth intervals etc. could have differing durations, if this assists in terms of improving the value of the data collected.

FIG. 10

Figure 10:
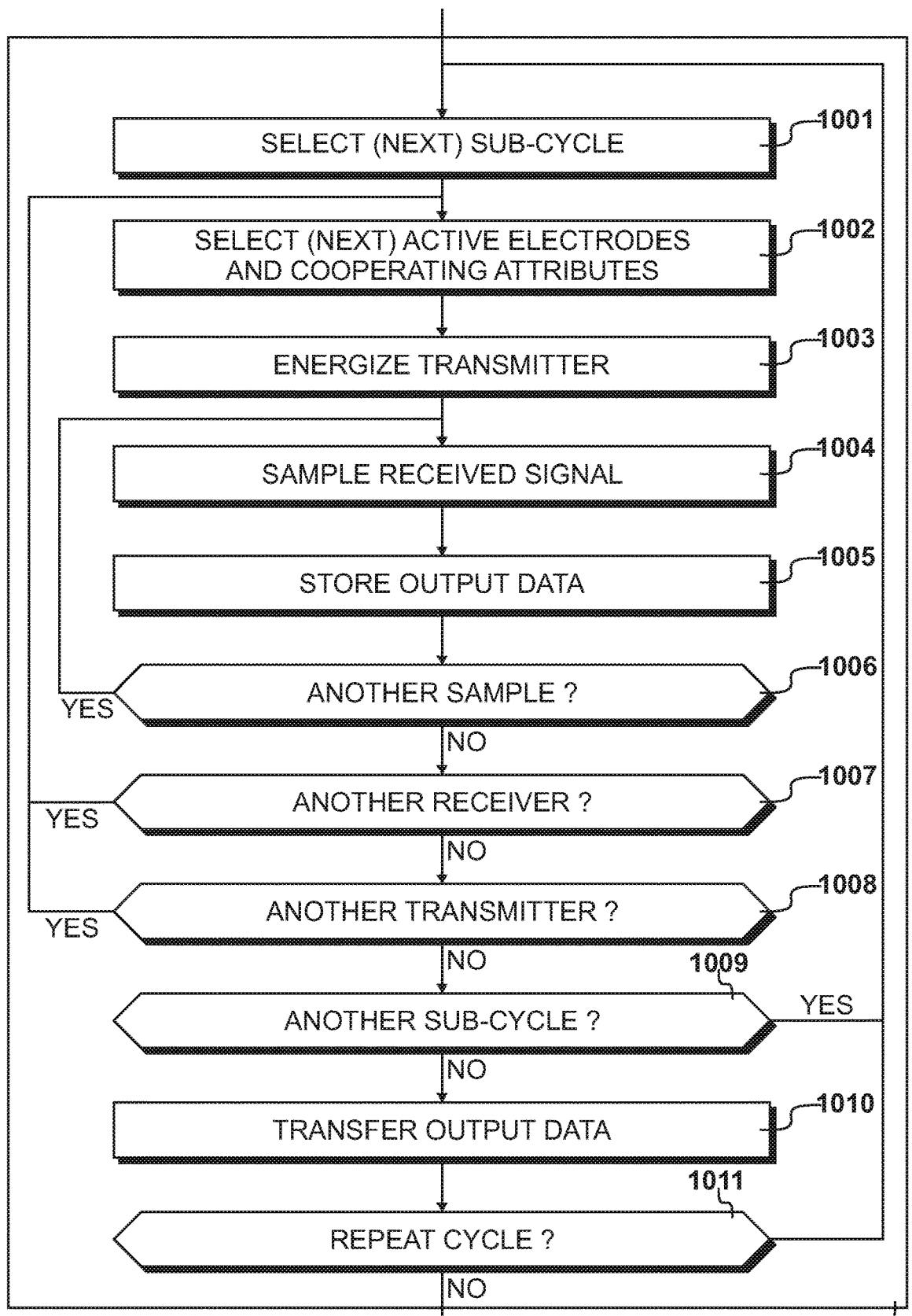
FIG. 10 details procedures performed by the processor shown in FIG. 4 during the examination identified in FIG. 8.

Procedures 802 performed by the processor 402 during a scanning cycle are illustrated in FIG. 10. At step 1001, a sub-cycle is selected which, on a first iteration, would be the first sub-cycle 905. As illustrated in FIG. 9, coupling operations are performed, starting with the first coupling operation 912. Thus, at step 1002 active electrodes are selected, consisting of a transmitter electrode and a receiver electrode. Thereafter, in accordance with an embodiment of the present invention, electrical attributes for the cooperating electrodes (321 to 329) are selected. In particular, in an embodiment, a selection is made for each cooperating electrode, such that its electrical attribute may be identified as being grounded, floating or energized. The selected transmitter electrode is then energized and the selected receiver electrode is monitored.

Step 1003 creates a coupling operation 952. During this coupling operation, digital-to-analog-conversion of the output signal takes place at a first sampling instant. Thereafter, at step 1005, a digital representation of the sample is stored.

At step 1006, a question is asked as to whether another sample is to be taken and when answered in the affirmative, the next analog-to-digital-conversion takes place again at step 1004. Thus, on the second iteration, the second digital value is stored at step 1005 and the question is then asked as to whether another sample is to be taken, at step 1006. Thus, typically, between three and twenty samples are taken during each coupling operation, whereafter the question asked at step 1006 is answered in the negative, representing the end of the coupling operation.

In an embodiment, a layering procedure is performed by selecting a transmitter and then, following a plurality of energizations upon the selected transmitter, performing a plurality of monitoring functions against a selection of receivers. As the selected receiver moves further away from the transmitter, the distance between the energized electrode and the monitored electrode increases, therefore the average depth of penetration increases.

Thus, if the question asked at step 1006 is answered in the affirmative, to the effect that another receiver is to be deployed, the next receiver is selected at step 1002 and a further energization occurs at step 1003. These procedures repeat until the question asked at step 1006 is answered in the negative, confirming that all of the receivers have been considered.

Each time a different receiver is selected at step 1002, appropriate modifications may be made to the selection of cooperating attributes; even when the selected transmitter does not change from the previous iteration.

At step 1008, a question is asked as to whether another transmitter is to be energized within the sub-cycle and when answered in the affirmative, the next transmitter is selected at step 1002. Thereafter, the receiver is selected and an energization is performed at step 1003. Thus, for the second selected transmitter, a plurality of receivers may be selected by repeated activation at step 1002.

Eventually, all of the transmitters will have been considered and the question asked at step 1008 will be answered in the negative. A question is then asked at step 1009 as to whether a further sub-cycle is to be performed and when answered in the affirmative, the next sub-cycle is selected at step 1001. Thus having completed the first sub-cycle 905, the second sub-cycle 906 is selected at step 1001.

Procedures performed for the second sub-cycle 906 are similar to those performed for the first sub-cycle 905. However, an offset occurs in terms of the particular electrodes selected, such that the first sub-cycle 905 may engage a first group of electrodes with the second sub-cycle 906 selecting a second group of electrodes. The complete scanning cycle 902 is only completed when the first group (for the first sub-cycle 905) and the second group (for the second sub-cycle 906) have been considered. Thereafter, the whole process is repeated during the second scanning cycle 903.

FIG. 11

Figure 11:
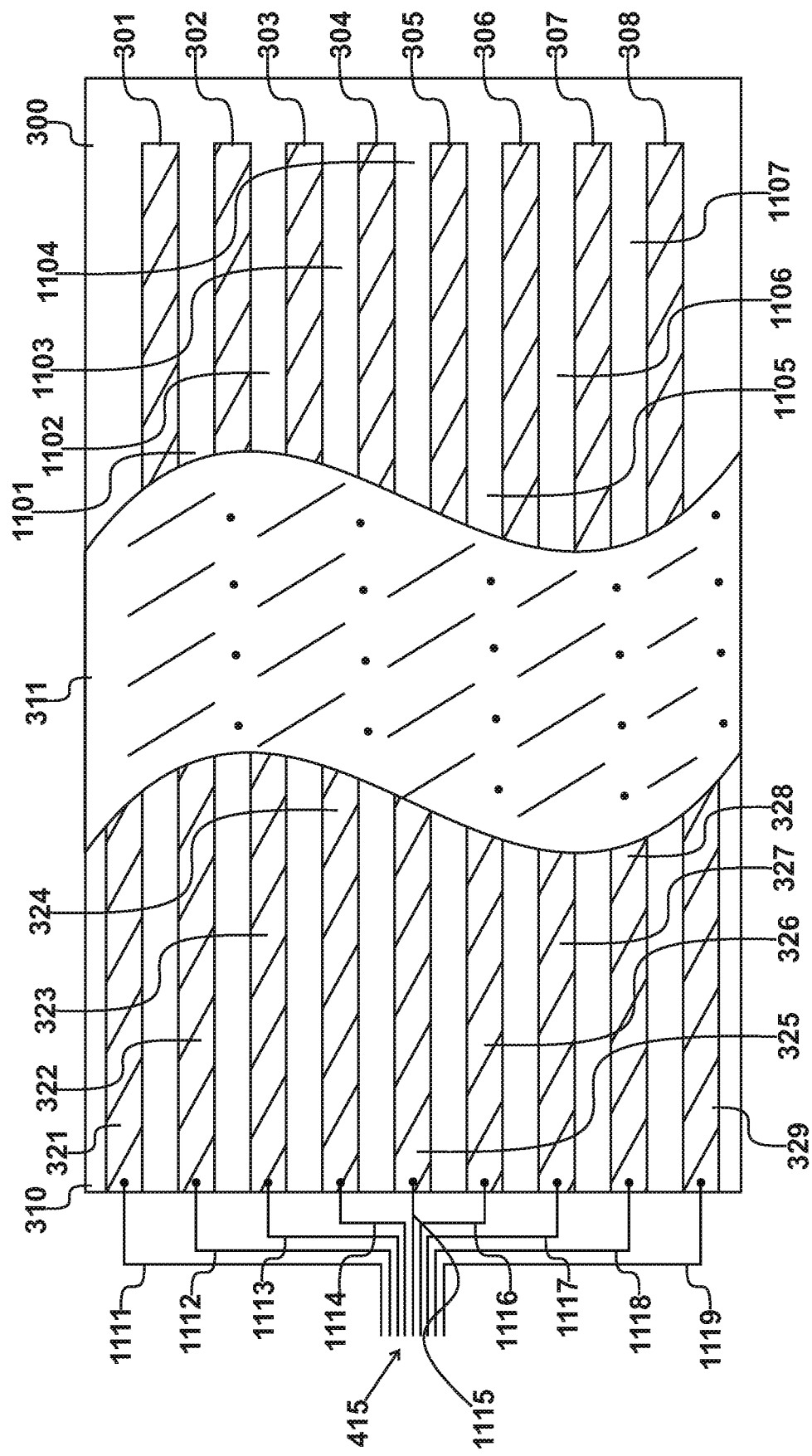
FIG. 11 shows a cut away view of the examination apparatus.

A cut away view of the examination apparatus 101 is shown in FIG. 11, showing the active plane 300, the cooperating plane 310 and spacer material 311 positioned between the active plane 300 and the cooperating-plane 310. The active electrodes 301 to 308 define substantially parallel tracks on the active plane 300, with a gap between each of the tracks. Thus, a first gap 1101 is present between the first active electrode 301 and the second active electrode 302. A second gap 1102 is present between the second active electrode 302 and the third active electrode 303. A third gap 1103 is present between the third active electrode 303 and the fourth active electrode 304. A fourth gap 1104 is present between the fourth active electrode 304 and the fifth active electrode 305. A fifth gap 1105 is present between the fifth active electrode 305 and the sixth active electrode 306. A sixth gap 1106 is present between the sixth active electrode 306 and the seventh active electrode 307. A seventh gap 1107 is present between the seventh active electrode 307 and the eighth active electrode 308.

In an embodiment, the cooperating electrodes 321 to 329 define substantially parallel tracks on the cooperating plane 310. Furthermore, in an embodiment, each cooperating electrode is substantially opposite a respective one of gaps 1101 to 1107. Thus, in the embodiment of FIG. 11, the second cooperating electrode 322 is opposite the first gap 1101. The third cooperating electrode 323 is opposite the second gap 1102. The fourth cooperating electrode 324 is opposite the third gap 1103. The fifth cooperating electrode 325 is opposite the fourth gap 1104. The sixth cooperating electrode 326 is opposite the fifth gap 1105. The seventh cooperating electrode 327 is opposite the sixth gap 1106 and the eighth cooperating electrode 328 is opposite the seventh gap 1107. In addition, to provide further shielding from noise, the first cooperating electrode 321 is positioned to the outside of the first active electrode 301. Similarly, the ninth cooperating electrode 329 is positioned to the outside of the eighth active electrode 308. In an embodiment, further shielding may be provided on the active plane 300.

Control lines 415 consist of a first control line 1111 connected to the first cooperating electrode 321. A second control line 1112 is connected to the second cooperating electrode 322 and a third control line 1113 is connected to the third cooperating electrode 323. The fourth cooperating electrode 324 is connected to a fourth control line 1114, with a fifth control line 1115 connected to the fifth cooperating electrode 325. A sixth control line 1116 is connected to the sixth cooperating electrode 326 and a seventh control line 1117 is connected to the seventh cooperating electrode 327. An eighth control line 1118 is connected to the eighth cooperating electrode 328 and a ninth control line 1119 is connected to the ninth cooperating electrode 329.

In the example shown in FIG. 11, eight active electrodes are provided, with an appropriate number of cooperating electrodes, such that each gap between active electrodes is adjacent to one of the cooperating electrodes. However, it should be appreciated that in other embodiments, the number of active electrodes may be increased, with an appropriate increase in the number of cooperating electrodes, to provide an examination apparatus with the required size and spatial resolution.

In the embodiment of FIG. 11, the cooperating electrodes are shown positioned adjacent to gaps between active electrodes. However, it should be appreciated that in other embodiments, alternative arrangements may be made, such that the cooperating electrodes may align with the active electrodes for example.

FIG. 12

Figure 12:
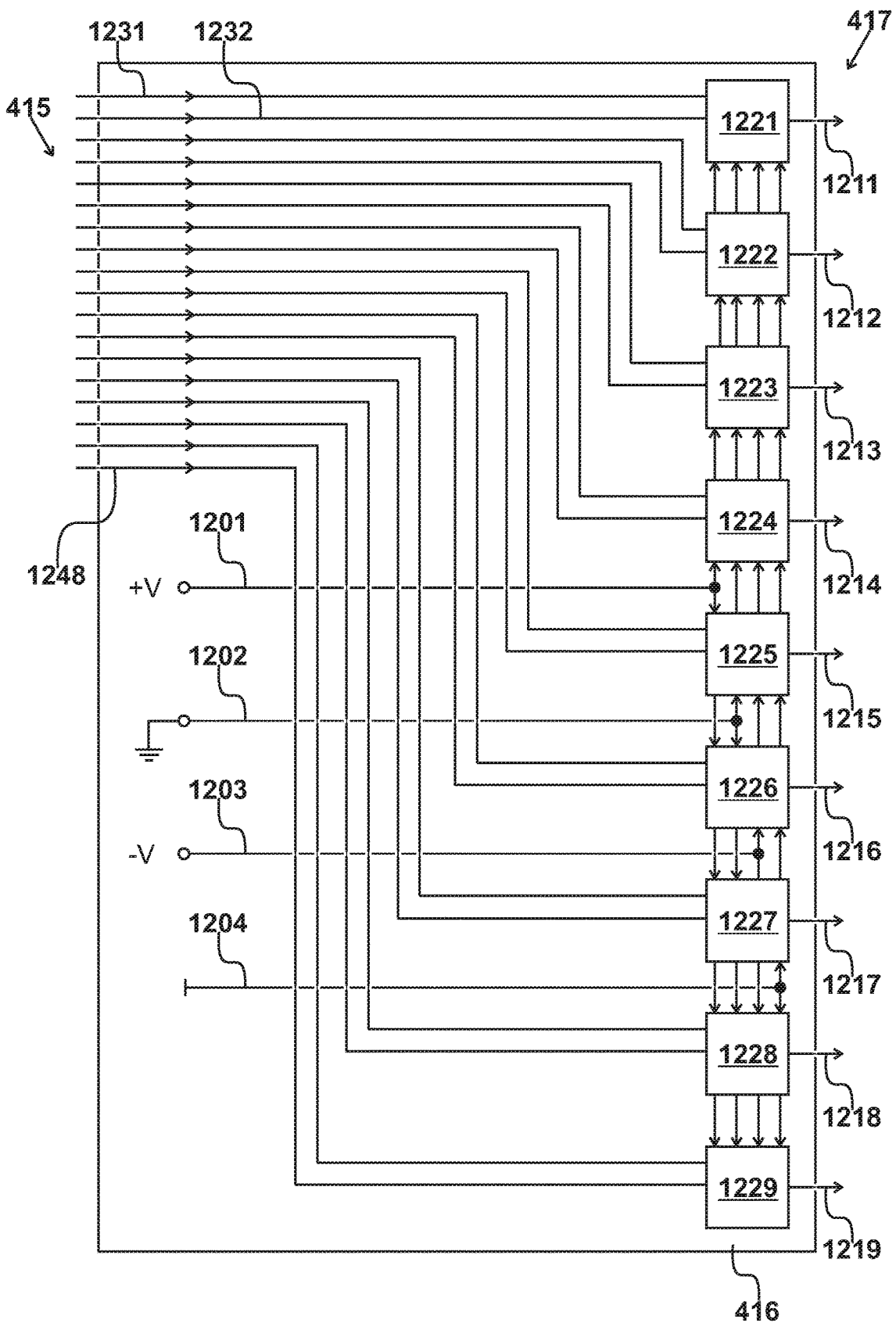
FIG. 12 shows a schematic representation of selectable electrical attributes.

In an embodiment, the processor is configured to select an electrical attribute from a list including grounding, floating and energizing. A schematic representation of this is illustrated in FIG. 12. A programmable port on the processor 402 is represented by a node 1201 of a switch 1202. Operation of switch 1202 represents the selection of an electrical attribute by the processor for a specific cooperating electrode during the coupling operation. One such port is shown in FIG. 12 connected to control line 1111. However, in the embodiment of FIG. 11, further ports are required connected respectively to the additional control lines 1112 to 1119.

In the configuration shown in FIG. 12, switch 1202 is at a position selecting a ground attribute 1203. Operation of switch 1202 to pole 1204 allows energization to be selected. In particular, this represents negative energization which would be applied to cooperating electrodes on either side of the monitored electrode to further focus the electric field in the direction required. Thus, the application of negative energization is similar to grounding but achieves a greater effect.

Rotation of switch 1202 to pole 1205 allows positive energization to be selected. Energization of this type would be applied to cooperating electrodes at the position of an energized active electrode, to reinforce the field created by the energized electrode.

Finally, in this embodiment, selection of pole 1206 effectively leaves control line 1111 open, in a condition usually referred to as floating.

FIG. 13

Figure 13:
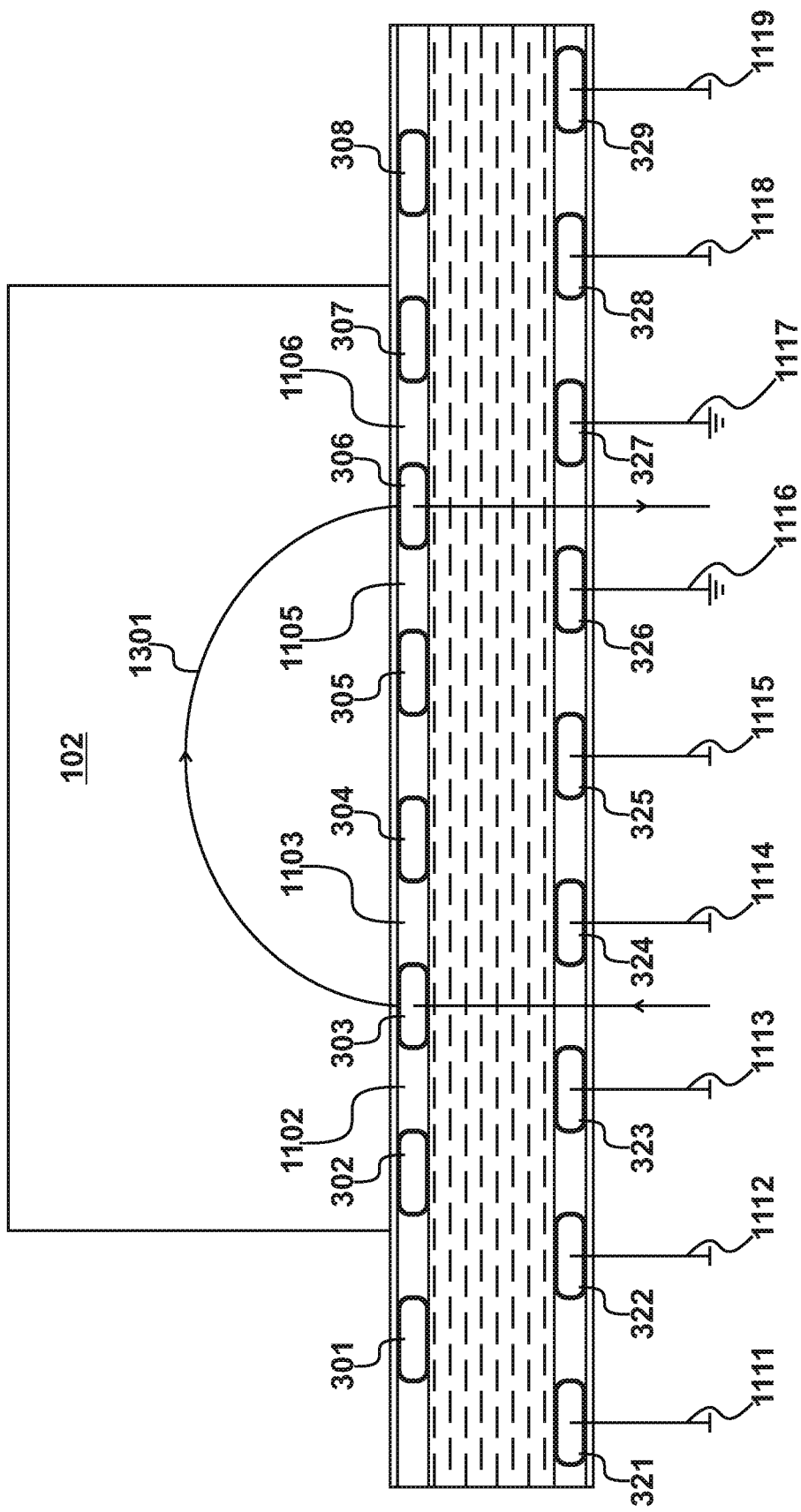
FIG. 13 shows a configuration of electrodes according to a first embodiment.

In the embodiment, of FIG. 13, the third active electrode 303 has been selected to transmit and the sixth active electrode 306 has been selected to receive. Thus, the third active electrode 303 is energized and the sixth active electrode 306 is monitored. This results in the generation of electric field 1301.

The monitored electrode 306 is adjacent to a near-gap (the fifth gap 1105) that is closer to an energized electrode (energized electrode 303) than a distant-gap (the sixth gap 1106) that is further from the energized electrode 303. In this embodiment, the processor has been configured to ground a near cooperating electrode (the sixth cooperating electrode 326) that is opposite the near-gap (the fifth gap 1105). In addition, the processor is also configured to ground a distant cooperating electrode (the seventh cooperating electrode 327) that is opposite the distant-gap 1106.

In this embodiment, the remaining cooperating electrodes 321 to 325 and 328 to 329 are configured to be floating. As a result of this, the near cooperating electrode 326 and the distant cooperating electrode 327 shield the monitored electrode (the sixth active electrode 306). However, given that the remaining cooperating electrodes are floating, they do not provide a transmission path for the electric field 1301, thereby reinforcing the strength of the electric field 1301 and focusing it towards the monitored electrode, that is the sixth electrode 306.

For the purposes of illustration, a second embodiment will be described with reference to FIG. 14, a third embodiment will be described with reference to FIG. 15 and a fourth embodiment will be described with reference to FIG. 16. In each of these embodiments, the third active electrode 303 is energized and the sixth active electrode 306 is monitored. However, it should be appreciated that in an embodiment, any active electrode is available to be energized and any of the remaining active electrodes are available to be monitored.

FIG. 14

An analog signal may be monitored at a receiver electrode because, during a coupling operation, it is capacitively coupled to a transmitter electrode. The resulting electric field passes through the object undergoing examination and, from an electrical perspective, the object may be modelled as a capacitance 1401 in parallel with a resistance 1402. As in known in the art, the resistance 1402 will provide a conduction path for all signals and, in particular, the resistance 1402 will allow direct current signals to pass. The resistance 1402 may be identified as having a specific numerical resistance or the reciprocal of this value may be identified in terms of its conductance.

As is known in the art, the capacitance 1401 will allow transient signals to pass but will appear as an open circuit to non-transient values. Thus, non-alternating signals are blocked, whereas alternating signals are allowed to pass.

Thus, a higher value signal may pass for higher values of capacitance and higher frequencies of alternating signals. An assessment of this capacitance provides an indication of the electrical permittivity of the object being examined. In practice, objects present different values of permittivity and conductivity. Thus, the present invention seeks to make more data available to assessment procedures, such that an object's material may be distinguished where differences occur with respect to permittivity and/or conductivity.

Figure 14:
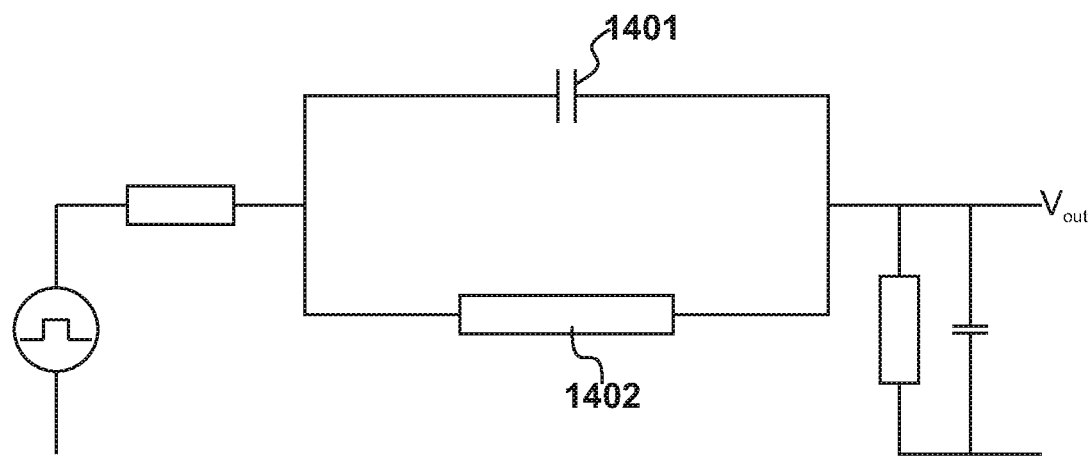
FIG. 14 shows an example of monitoring and sampling an analog output signal.
Figure 14:
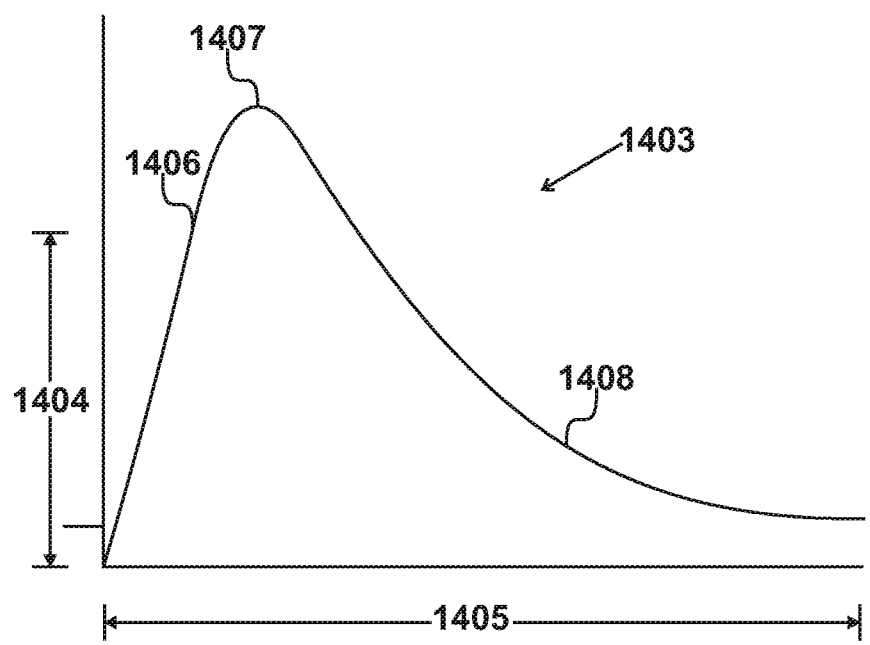

An example 1403 of a monitored analog output signal is shown in FIG. 14. In this example, output voltage 1404 has been plotted against time 1405. The output response 1403 itself may be identified as having a rising edge 1406, a peak 1407 and a falling edge 1408. In response to an input strobing signal 206 (as described with reference to FIG. 2) the rising edge 1406 may be seen as a charging portion and the falling edge 1408 may be seen as a discharging portion. The input signal 206 rapidly rises to a sustained level. The input pulse 206 may therefore be seen as having a very high frequency component at the beginning. It can therefore be appreciated that, in terms of transmission through the object, the capacitance 1401 provides a lower impedance during the rising portion 1406, leading to the peak value 1407. Thereafter, conductance through the discharge portion 1408 occurs at a rate that is determined predominantly by the resistance 1402.

It can therefore be seen that an assessment of peak value 1407 provides output data that is influenced predominantly by the permittivity of the material under consideration. Similarly, the rate at which the signal decays during portion 1408 provides data that is predominantly determined by the electrical conductively of the object, as represented by resistance 1402.

In an embodiment, the apparatus does not seek to measure actual values for permittivity and conductivity of the object. The apparatus is calibrated initially by taking measurements without an object being present. Measurements are then taken for particular objects. Properties of objects may be assessed by making comparisons with previously recorded values for objects of known consistency. Thus, output information can be presented identifying the material of an object, given that the electrical properties measured by the process are identified as being closest to a particular measurement made for a known object.

In particular, the assessment may determine that a particular substance or material is possibly present or not; allowing a decision to be made quickly as to whether further investigation would be appropriate.

FIG. 15

As described with reference to FIG. 13, a coupling operation involves energizing the third electrode 303 and monitoring the sixth electrodes 306. In an embodiment, during the next coupling operation, the third electrode 303 is again energized but on this occasion the seventh electrode 307 is monitored, resulting in the generation of electric field 1501. Electric field 1501 penetrates further into object 102, using a process that has become known as layering. Thus, to achieve layering, two electrodes are separated by a first distance as a first coupled pair (303 and 306) during a first coupling operation. This is then followed by the selection of two electrodes (303 and 307) separated by a second distance as a second coupled pair during a second coupling operation. As can be seen by comparing FIG. 15 against FIG. 13, the second distance is larger than the first distance. Furthermore, the first coupled pair and the second coupled pair both include a first electrode in common, namely the third electrode 303.

Figure 15:
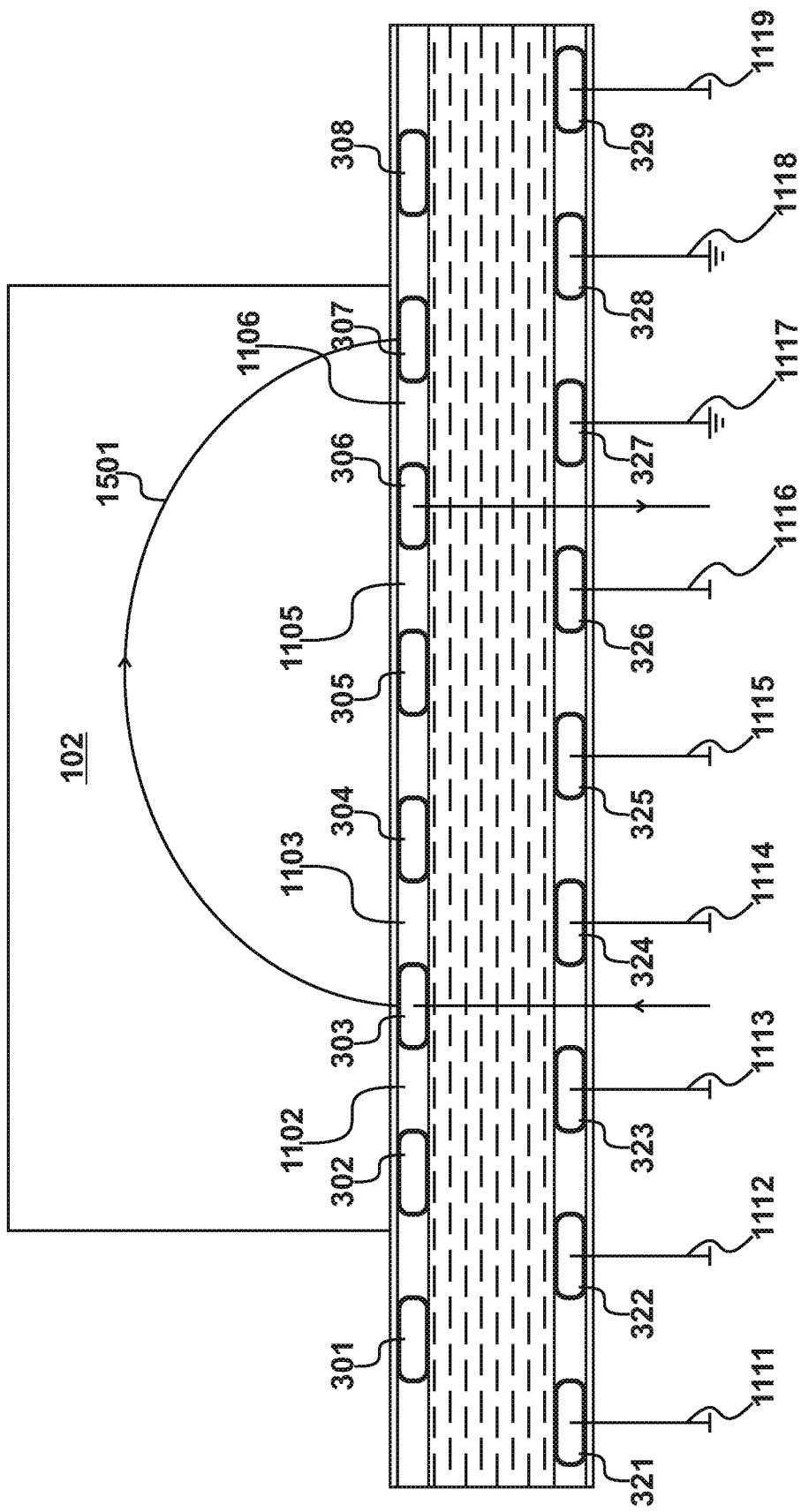
FIG. 15; illustrates a coupling operation in which the third electrode is again energized but with the seventh electrode being monitored

Furthermore, in the embodiment shown in FIG. 15, cooperating electrode 326 is now floating and cooperating electrode 328 is now connected to ground.

FIG. 16

Figure 16:
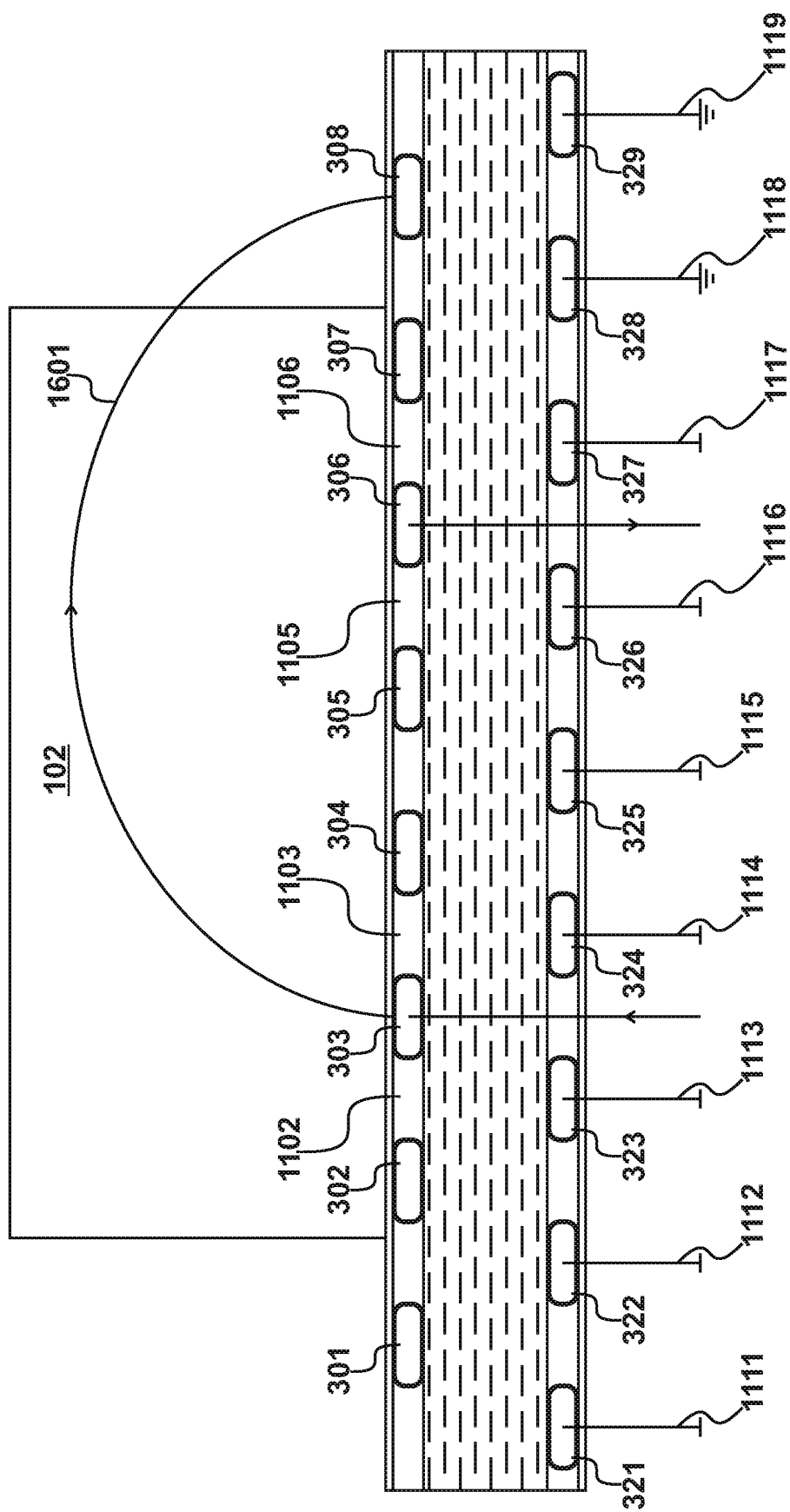
FIG. 16 shows a further extension of the layering process.

As shown in FIG. 16, the layering process may be extended by sequentially selecting further coupled pairs of electrodes during respective coupling operations, again with each including the first electrode in common. Thus, in the embodiment shown in FIG. 16, the third electrode (the electrode in common) is energized again but the eighth electrode 308 is monitored, resulting in the generation of an electric field 1601.

In an embodiment, the layering procedure may be extended further by introducing a technique referred to as reverse layering. In particular, further coupled pairs are sequentially selected during respective coupling operations, where each further coupled pair including a second electrode in common. Thus, to implement this technique, the eighth electrode 308 could be identified as the electrode in common and this electrode could be energized. The eighth electrode could be energized for sequential coupling operations, during which the seventh electrode 307 is monitored during a first coupling operation, the sixth electrode 306 is monitored during a second coupling operation, a fifth electrode 305 is monitored during a third coupling operation, the fourth electrode 304 is monitored during a fourth coupling operation and the third electrode 303 is monitored during a fifth coupling operation. In this embodiment, the electrode in common 308 is always energized. However, these coupling patterns could be achieved by energizing other electrodes while maintaining the eighth electrode 308 as the second electrode in common.

The invention claimed is:

1. An apparatus for examining objects with electric fields, comprising:
   a set of active electrodes;
   an energizing circuit for energizing a selected one of said set of active electrodes as a transmitter;
   a monitoring circuit for monitoring a selected one of said set of active electrodes as a receiver, such that an energized transmitter electrode and a monitored receiver electrode establish a coupled pair of capacitively coupled electrodes during a coupling operation; and
   a processor, wherein said processor is configured to:
      sequentially energize a plurality of transmitter electrodes to establish a plurality of coupling operations during a scanning cycle;
      during each of said plurality of coupling operations:
         sample an analog output signal from said monitoring circuit to produce first sample data, and
         further sample said analog output signal to produce second sample data;
      analyse said first sample data to identify a first property of each examined object; and
      analyse said second sample data to identify a second property of each examined object.

2. The apparatus of claim 1, further comprising:
   an input multiplexer for selecting a transmitter electrode from said set of active electrodes during each said coupling operation; and
   an output multiplexer for selecting a receiver electrode from said set of active electrodes during each coupling operation.

3. The apparatus of claim 1, wherein said processor is configured to:
   trigger a strobing circuit configured to energize said transmitter electrode; and
   control an energizing voltage produced by said strobing circuit.

4. The apparatus of claim 1, wherein:
   said processor includes an analog to digital converter; and
   said analog to digital converter is configured to produce digital output values each time a specific analog output signal is sampled and then further sampled.

5. The apparatus of claim 4, wherein said analog to digital converter produces a first digital sample substantially at a peak of said analog output signal.

6. The apparatus of claim 5, wherein said analog to digital converter is configured to produce further digital samples at predetermined intervals after said peak.

7. The apparatus of claim 1, wherein said processor is configured to:
   select two of said electrodes separated by a first distance as a first coupled pair during a first coupling operation; and
   select two of said electrodes separated by a second distance as a second coupled pair during a second coupling operation; wherein:
      said second distance is larger than said first distance; and
      said first coupled pair and said second coupled pair both include a first electrode in common.

8. The apparatus of claim 7, wherein said processor is configured to sequentially select further coupled pairs of electrodes during respective coupling operations, each including said first electrode in common.

9. The apparatus of claim 7, wherein said processor is configured to sequentially select further coupled pairs of electrodes during respective coupling operations, wherein each said further coupled pair includes a second electrode in common.

10. The apparatus of claim 1, further comprising a set of substantially parallel cooperating electrodes displaced from said set of active electrodes, wherein said processor is configured to selectively ground said cooperating electrodes.

11. A method of examining objects using electric fields created by a set of electrodes, in which:
    a selected electrode from said set of electrodes is energized as a transmitter; and
    a different selected electrode from said set of electrodes is monitored as a receiver, to establish a capacitively coupled pair of electrodes defining a coupling operation, comprising the steps of:
       sequentially energizing a plurality of transmitter electrodes to establish a plurality of coupling operations during a scanning cycle;
       during each of said plurality of coupling operations:
          sampling an analog output signal from a monitored receiver electrode to produce first sample data, and
          further sampling said analog output signal to produce second sample data;
       analysing said first sample data to identify a first property of each examined object; and
       analysing said second sample data to identify a second property of each examined object.

12. The method of claim 11, wherein said sampling step produces said first sample data substantially at a peak value of said analog output signal.

13. The method of claim 12, wherein said further sampling step produces additional sample data after said peak value.

14. The method of claim 13, wherein:
    said further sampling step produces more than three instances of additional sample data after said peak value; and
    said further sampling step produces less than twenty instances of additional sample data after said peak value.

15. The method of claim 11, wherein:
    said sampling step is performed following a first interval after a start of said coupling operation; and
    a first of said further sampling steps is performed after a second interval after said sampling step produces said first sample data.

16. The method of claim 15, wherein subsequent additional samples are mutually separated by intervals substantially equal to said second interval.

17. The method of claim 11, further comprising the steps of:
    selecting two of said electrodes separated by a first distance as a first coupled pair during a first coupling operation; and selecting two of said electrodes separated by a second distance as a second coupled pair during a second coupling operation; wherein:
  said second distance is larger than said first distance; and
  said first coupled pair and said second coupled pair both include a first electrode in common.

18. The method of claim 17, further comprising the step of sequentially selecting further coupled pairs of electrodes from said set of electrodes during respective coupling operations, each including said first electrode in common.

19. The method of claim 17, further comprising the step of sequentially selecting further coupled pairs of electrodes from said set of electrodes during respective coupling operations, wherein each said further coupled pair includes a second electrode in common.

20. The method of claim 11, wherein:
  a set of substantially parallel cooperating electrodes are displaced from said set of electrodes; and
  further comprising the step of selectively grounding said cooperating electrodes.

* * * * *